Aug. 10, 1954  A. E. BAILEY ET AL  2,686,301
ELECTRICAL SIGNAL INDICATING SYSTEM
Filed July 31, 1947  3 Sheets-Sheet 1

*Inventors*
A. E. Bailey
F. E. J. Girling
J. W. Pletts

By— *Nelson Moore*
*Attorney*

Aug. 10, 1954  A. E. BAILEY ET AL  2,686,301
ELECTRICAL SIGNAL INDICATING SYSTEM
Filed July 31, 1947  3 Sheets-Sheet 2
FIG. 3
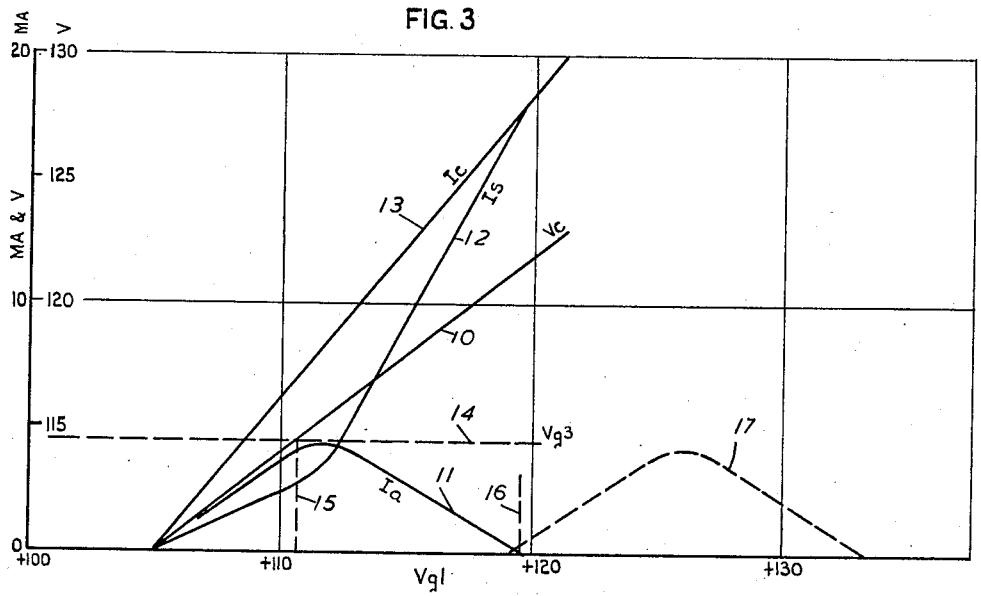
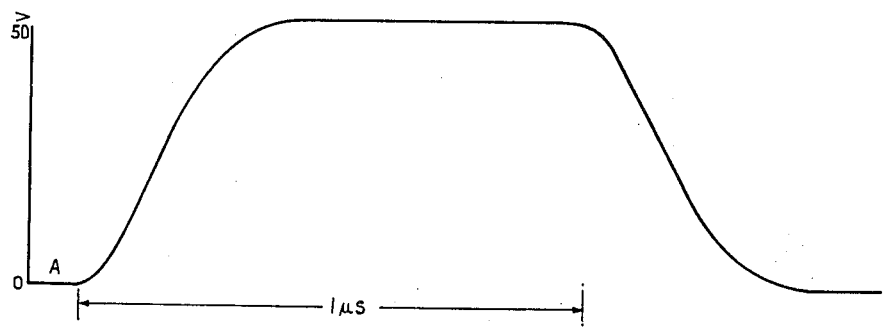
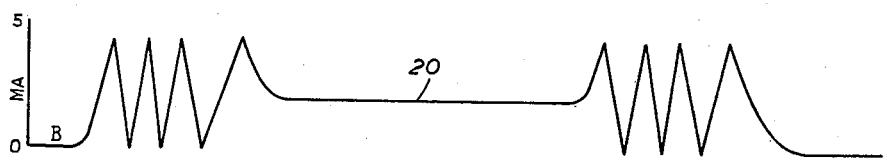
FIG. 4.
Inventors
A. E. Bailey
F. E. J. Girling
J. W. Pletts
By- *Attorneys*

Patented Aug. 10, 1954

2,686,301

UNITED STATES PATENT OFFICE 2,686,301

ELECTRICAL SIGNAL INDICATING SYSTEM

Arthur E. Bailey, Malvern Link, and Frank E. J. Girling and John W. Pletts, Malvern, England, assignors to the Minister of Supply in His Majesty's Government of the United Kingdom of Great Britain and Northern Ireland, London, England Application July 31, 1947, Serial No. 765,006
In Great Britain September 13, 1945

Section 1, Public Law 690, August 8, 1946
Patent expires September 13, 1965

14 Claims. (Cl. 343—5)

The present invention relates to electrical signal indicating systems in which signals ranging over a substantial range of amplitude are to be displayed as spots of light, for example, on a cathode ray tube screen.

It is the principal object of the invention to provide, in or for such a system, an electrical signal transmission circuit having a non-rectilinear characteristic relating its input and output voltages, the nature of the characteristic being such that small variations in input voltage about any input level between predetermined limits appear at the output as variations which are a substantially greater fraction of the total output voltage range.

The invention is of particular, but not exclusive application to pulsed radar and like systems in which use is made of the frequency modulation of reflected signals due to the Doppler effect, in order to distinguish signals from moving reflecting objects from those due to fixed objects. It is well known that in such systems, when echoes are received from moving and stationary objects at the same range, the received composite echo beats in amplitude at the frequency by which the echo from the moving object is modulated, the so-called Doppler frequency. In systems in which permanent echoes cannot be relied upon to beat with signals from moving objects, it has been proposed to provide a locally-generated reference oscillation to perform the same function.

It has been proposed to display such beating echoes upon the screen of a cathode ray tube, the echo signals being applied so that they modulate the beam intensity about a value between zero and fully bright; the beam is deflected in two directions at right angles to form a rectangular raster, one deflection being at, say, pulse repetition frequency, and the other being at a slower rate. In such an arrangement, the successive beating echoes from a moving object may be arranged to be displayed side by side, so that each such object gives rise on the screen to a striated patch.

A limitation of systems such as are described in the preceding paragraph arises, however, when the amplitude of the beat (which is to give rise in the display to a patch of varying brightness) may vary between wide limits, and may, moreover, be superimposed on a composite signal which itself may have an amplitude varying within wide limits. This is by no means an uncommon set of circumstances, since in many radar applications, the strength of reflected signals received from both moving and stationary objects varies widely. It will be apparent that in a display such as is discussed above, the best results will be had when the ambit of intensity variation is large, and it is a further object of the invention to provide a radar receiver, having such a display, in which signals which beat over a small amplitude range are enabled to give rise to a substantial variation in beam intensity.

The invention provides an electrical signal transmission circuit having a non-rectilinear characteristic relating its input and output voltages, wherein it is arranged that over a successively increasing range of input levels, the output level rises to a maximum value, falls substantially to zero as the input level is further increased, and, on a still further increase, rises again substantially to said maximum value, and so on, so that, within this range the characteristic exhibits a plurality of peaks and troughs.

The invention also provides a radar receiver comprising a circuit according to the invention, and in such a receiver, beating echo signals may be fed through the circuit to a display in which the beam is modulated in intensity about a mean level; preferably, in such a case, the beam is deflected cylically to form a raster as described above.

It will be apparent that in such a receiver, a given small variation in input level will correspond to a substantially greater percentage variation in output level, and if the total output level range is made to correspond to an intensity variation from substantially black to fully bright, even signals of small amplitude variation will give rise to marked striations in the display.

In order that the nature of the invention and the manner in which it may be carried into effect shall be wholly apparent, a description will now be given, with reference to the accompanying drawings, of various embodiments thereof.

Referring to the drawings,

Figs. 1, 3 and 4 are explanatory diagrams,

Figure 1:
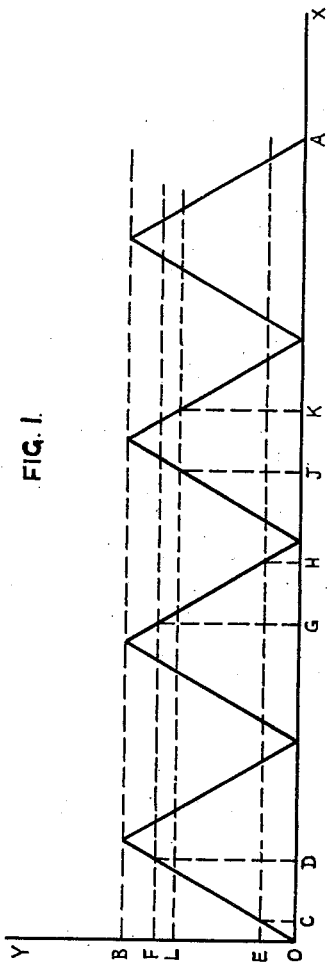

Fig. 1 shows an idealised characteristic of sawtooth form such as a transmission circuit according to the invention may have. The output is plotted in the Y-direction against the input in the X-direction. If such a circuit is required for the brightness modulation of a cathode ray tube as already described, then the input range O to A is arranged to accommodate the maximum composite echo amplitude to be handled, and the output range O to B is chosen to correspond with the modulating voltage required to cover the range between zero brightness of the cathode ray tube trace at O and maximum brightness at B. If the input signal variations cover a range such as C to D, which is only a small portion of OA, then the output variations cover the range EF, which is a substantial part of the brightness range available. If the input signal variations cover the range GH where the slope of the characteristic is negative, a similar range of output variations will be obtained, and the fact that the slope is negative will not affect the appearance of the striations on the tube screen. If the input signal variations cover the range JK, including one of the peaks of the curve, then the corresponding output will vary between L and B; these output variations will not be as large as would be obtained were the same input variations to lie within a straight part of the curve, but they will still cover a substantial portion of the whole range OB. The output obtained with input variations between J and K will also be doubled in frequency, but striations will still be visible, and will permit moving objects to be distinguished. A similar range of output variations, similarly frequency doubled, will occur if the input varies over one of the troughs of the curve.

Figure 2:
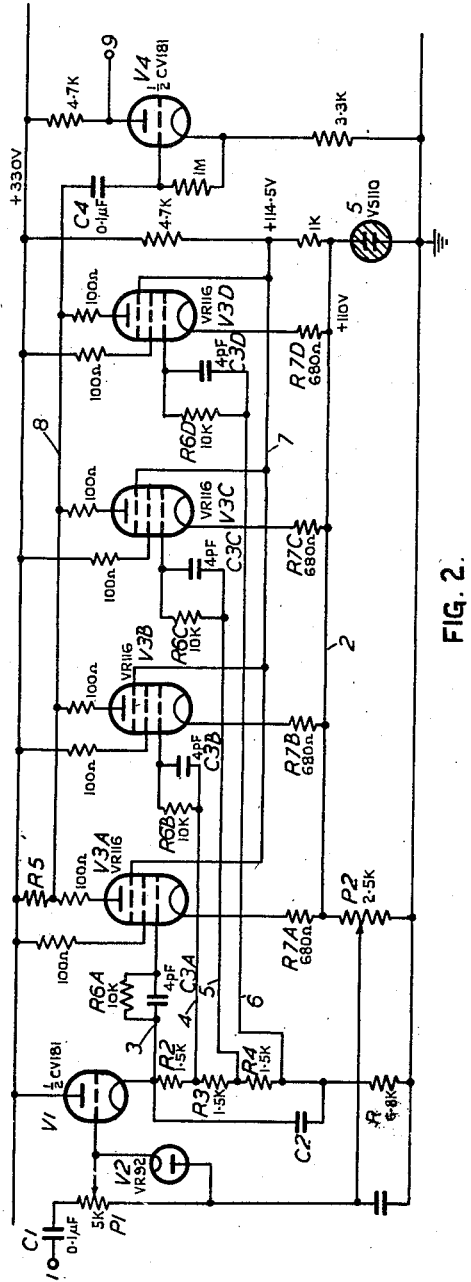
Fig. 2 shows schematically a circuit according to the invention.

Figure 2 shows in detail an amplifier having a characteristic of the kind shown in Fig. 1, and constituting a circuit according to the invention. The values of the various components shown in the figure are those which have been found to give satisfactory operation in a radar system using pulses of one microsecond duration. The symbols Ω, K and M indicate ohms, thousands of ohms and megohms respectively. The valve references shown are the Service type numbers. Beating radar signals are assumed to be applied as postive pulses at the point 1, and pass through the condenser C1 to the grid of the cathode follower V1, the amplitude at this point being determined by the position of the slider on the potential divider P1, and the grid bias by the position of the slider on the potential divider P2; the latter is connected between earth and the line 2 which is held at 110 volts positive by means of the constant-voltage gas-discharge tube 5. The grid of V1 is prevented from falling below the voltage of the slider of P2 when the input signal is most negative, that is to say between pulses, by the diode V2. This is sometimes referred to as D. C. restoration, and functions to keep the voltage of the grid of V1 at a constant value between pulses no matter what proportion of pulses is present in the input signal. The cathode follower has a load resistance R in series with the condenser C2 shunted by the resistances R2, R3 and R4 in series. The condenser C2 ensures that there is no signal drop across the resistance chain R2, R3, R4 but owing to the fact that the current for V1 flows through this chain, the signal appears with a different bias on each of the lines 3, 4, 5 and 6. If the slider of P2 is adjusted to make the voltage between pulses on line 3 about 105 volts positive relative to earth, then there will be about 14 volts drop across each of the resistances R2, R3, and R4, the lines 4, 5 and 6 being at 91, 77 and 63 volts positive to earth between pulses. The signals with these different biases are fed to the four identical valve circuits comprising the valves V3A, V3B, V3C and V3D, sharing a common load R5. These valves are of the Service type VR116 in which the anode current may be controlled by the voltage on the inner and outer grids, the outer grid being more closely wound than the normal suppressor grid, so that both the inner and outer grids have about the same grid bias. The valves and corresponding components in each circuit have the same reference letter and number, but are distinguished by suffixes A, B, C and D. The signal is fed from line 3 through R6A shunted by C3A to the control grid of V3A. In the absence of a pulse the control grid is at +105 volts, that is, 5 volts negative relative to the line 2, and thus is at or near cut off point. The outer control grid is connected to the line 7 which is held at 114.5 volts, that is, 4.5 volts above cathode voltage under these conditions, and has little or no effect upon the current flowing to the anode. When a pulse arrives on line 3, the grid of V3A rises in voltage and anode current passes in the valve V3A. This causes the cathode to rise in voltage due to the current passing through R7A, and the voltage on line 8 falls.

Figure 3 shows curves in which cathode voltage 10, anode current 11, screen current 12 and total valve current 13 for the valve V3A are plotted against voltage on the line 3 as abscissa. The outer grid voltage is marked at 14. When the voltage on line 3 rises above 105 volts, the curve 10 rises linearly at a slope which is given by $$\frac{R7}{Ra+R7(1+\mu)}$$

where $\mu$ and $Ra$ are the amplification factor and anode impedance respectively of the valve V3A when triode connected. All four curves are linear until the input level reaches the value 15 corresponding to about 110.6 volts, at which input level the cathode reaches the voltage of the outer grid as shown by the intersection of the lines 10 and 14. If the input is further increased, the cathode continues to rise in voltage, so that the third grid becomes negative relative to the cathode, and starts to reduce the anode current. This causes an increase in screen current, as shown. When the input reaches the value 16, corresponding to about 119.6 volts, the cathode is 7 volts positive relative to the outer control grid, and at this value the anode current is substantially cut off. Further increase in the input increases the current in the valve, which is now entirely screen current, since no anode current can flow. If the input is increased sufficiently to cause grid current, the voltage drop across R6A prevents further increase of control grid voltage. Thus over the range between 15 and 16, that is over 14.4 volts, the anode current change follows the curve 11, which approximates to an isosceles triangle. Owing to the fact that the signal on the line 4 fed to V3B is biassed 14 volts negative relative to line 3, this valve starts passing current when the signal on line 3 reaches 119 volts, as shown by the dotted line 17. As the currents in the anode circuits of V3A, V3B etc., flow through the same anode load R5, each valve gives a further peak to the curve, and with four identical circuits as shown, the curve of current in R5 plotted against voltage on the line 3 will show four portions of positive slope and four portions of negative slope for an input variation of 56 volts (14 volts for each valve).

The foregoing is an explanation of the basic principles of operation of the circuit, and not an exhaustive description of all the effects involved. Considerable variations in the current and voltage values given must be expected using different individual valves, owing to the variations in characteristics from valve to valve.

The negative pulse amplitude on the line 8 has a maximum value of about 20 volts. This is reversed and amplified to about 30 volts in the amplifier V4, and the output at the point 9 is fed to the grid of the cathode ray tube to control the beam intensity. In this embodiment, the valves V1 and V4 are both mounted inside a single evacuated envelope, and have a common heater supply for their cathodes; otherwise they are electrically separate. The assembly of two valves in one envelope which is preferably employed is known by the type number CV181.

Figure 4 shows at A the type of input to be expected at the point 1 (Fig. 1) if a pulse of 1 microsecond duration is received. The back and front edges of the pulse are both rendered sloping because of the limited frequency band width of the amplifier stages through which the signal must pass before reaching the point 1. The pulse is assumed to be of an amplitude of 53 volts, that is, almost the maximum voltage which the saw-tooth circuit is designed to handle. Figure 4 shows at B, on the same time scale, the total anode current in the four valves V3A, V3B, V3C and V3D. It is desired to derive a voltage corresponding to the current at 20 to control the brightness of the tube screen, and brighter spots should not be produced at the beginning and end of each large amplitude pulse. Owing, however, to the stray capacity effectively between the lines 8 and 9 and earth (which capacity may be supplemented if desired) the frequency response of the whole circuit is limited at the high frequency end, and a voltage pulse as shown at Fig. 4C appears at the point 9.

Figure 5:
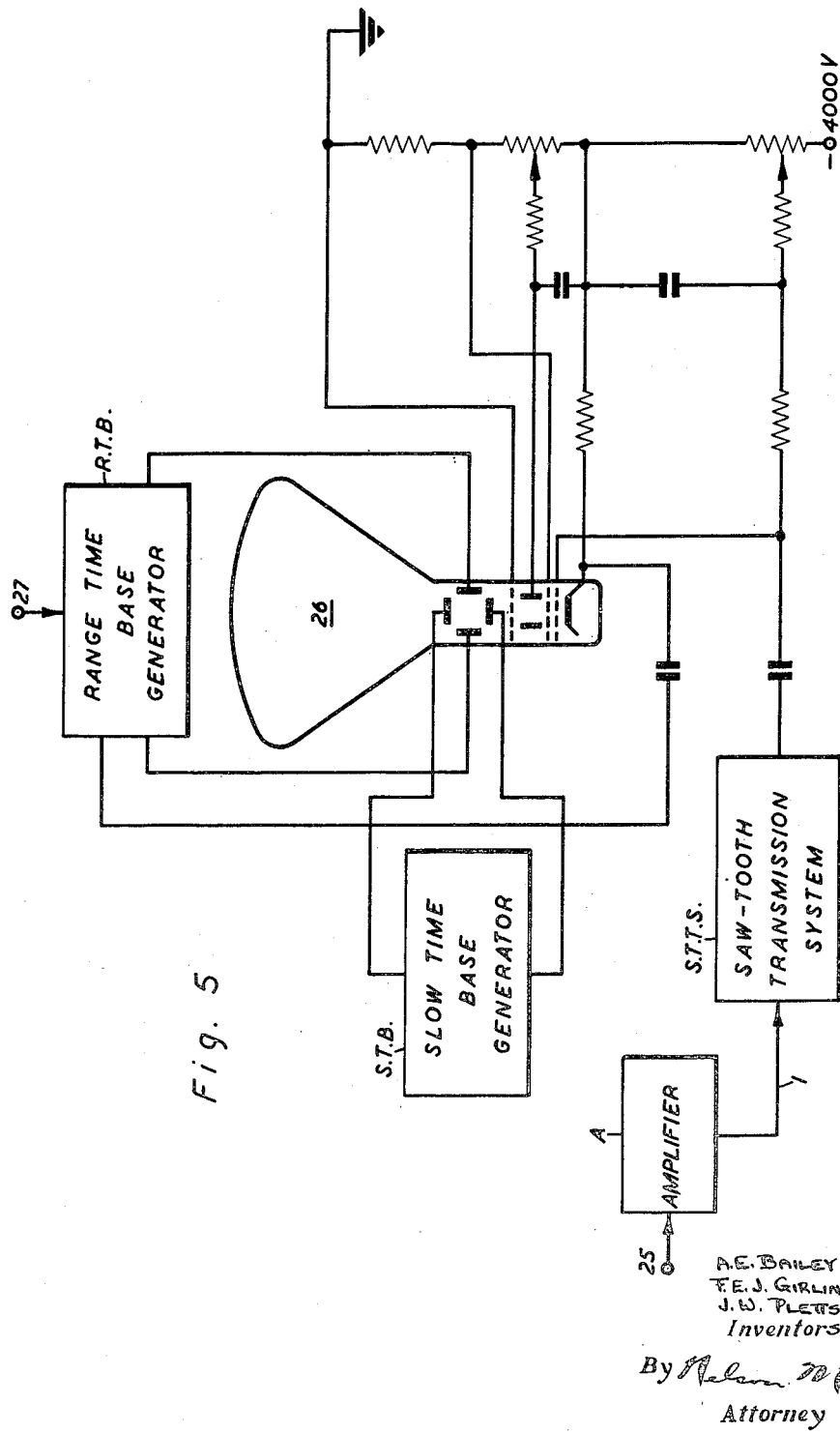
Fig. 5 illustrates the application of the invention to a radar receiver.

Figure 5 is a schematic diagram of a part of a radar receiver including a non-linear transmission circuit such as that described with reference to Fig. 2. Beating signals at video frequency are fed to the point 25, amplified in the circuit A, and applied to the input of the saw-tooth transmission system S. T. T. S. feeding the modulating electrode of the cathode ray tube 26 having an afterglow screen. Supply circuits for the tube are indicated but will not be described as they conform to normal practice. Locking pulses corresponding to the transmitted pulses are fed in at 27, and a range time-base R. T. B. produces a range time base voltage between the two Y-plates. The circuit R. T. B. also produces a negative pulse which is applied to the cathode of the tube so that the trace can be brightened only during the range time base sweeps. A slow time base S. T. B. produces slow sweeps each lasting about a second and followed by a fast fly-back. The amplitude of the slow sweep is made such that successive range sweeps are laid down side by side, so that in each period of the slow time base, a rectangular raster is scanned on the screen.

It must be understood that the invention is, in no way limited in its application to radar systems, nor is it limited in scope to the arrangement described with reference to Fig. 2. The characteristic may be arranged to have any desired number of peaks and troughs, and rising and falling parts of the characteristic may have different slopes. The peaks need not all correspond to the same output level, and one or more of the troughs may be at a level other than zero. The shape of the characteristic will in general be determined by the use to which the circuit is to be put, and those versed in the art, after a study of the Fig. 2 arrangement, will appreciate what modifications are necessary, for any particular purpose, in the choice, values and dispositions of the circuit elements.

The radar receiver arrangement described with reference to Fig. 5 is by way of example only. Other radar systems in which transmission circuits according to the invention may be applied will be known to those versed in the art.

The word "impeder" used in the claims is a well known generic expression and is used in the claims to describe the several resistors described above.

We claim:

1. A system for transforming a wave comprising a plurality of electron discharge devices each having a cathode, a control grid, a screen grid, a third grid and an anode; said grids being removed from the cathode in the order named; a bias circuit for applying fixed potentials to said third grids which potentials are positive with respect to the potential of the respective cathodes when the circuit is quiescent, cathode biasing impeders in series with said cathodes respectively, a bus connecting together the ends of said impeders which are remote from said cathodes, an output lead coupled to said anodes; a main source of direct current potential having its negative side connected to said bus, an impeder connecting the positive side of said source to said output lead, impeders respectively connecting each screen grid to said positive side of said source, and an input circuit including a tapped impeder coupled to the input wave, different percentages of said input wave being developed across said impeder between one end thereof and each of said taps, and means respectively coupling said taps to said control grids.

2. The system of claim 1 in which said tapped impeder has a first end which is connected to said bus and the other end of which is connected to one of said control grids, wires connecting the other control grids to different taps respectively on said tapped impeder, and means for applying the input wave across said tapped impeder with the said first end thereof being negative.

3. The system of claim 2 in which all of the impeders are resistors and in which the biasing values and discharge device characteristics are such that in response to a constantly increasing input wave the electron discharge devices will in sequence exhibit rising and falling outputs, with each rising characteristic following closely a falling characteristic of a preceding electron discharge device.

4. The system of claim 1 in which said input circuit includes means to differently bias said devices and in which the rise in voltage on the first of said electron discharge device necessary to cause cut-off through the device is substantially equal to the difference in the bias potentials of the control grids of the first and second electron discharge devices.

5. A signal indicating system comprising a signal indicator in which a spot of light is modulated in intensity by the signal to be indicated, and an input circuit coupled to said signal indicator comprising first means which includes means for increasing and subsequently decreasing its output in response to an increase in the input applied thereto between first and second potentials, said first means including means to effect substantially stable output conditions when the input potential thereto increases beyond said second potential, second means for increasing and subsequently decreasing its output in response to an increase in the input applied thereto between a third and a fourth potential, said second means including means to effect substantially stable output when the input potential thereto is below said third potential and also when it increases beyond said fourth potential, third means which includes means for increasing and subsequently decreasing its output in response to an increase in the input potential thereto from a fifth to a sixth potential, said third means including means to effect a substantially stable output in responses to changes in its input below said fifth potential, means for combining the outputs of all of the above-named means to effect a common output, and input means for applying a wave to the inputs of the first, second and third means; said input means including means operable in response to a constantly increasing input to increase the input potential on the first means from said first to beyond said second potential, to immediately thereafter increase the input potential to the second means from the third to beyond said fourth potential, and to then immediately thereafter increase the input potential to the third means from the fifth to at least the sixth potential.

6. The system of claim 5 in which the first, third and fifth potentials are equal, in which the second, fourth and sixth potentials are equal, in which the input means includes a tapped impeder for receiving the input waves across the same, and in which the inputs of the first, second and third means are respectively energized by predetermined sections of the tapped impeders.

7. The system defined by claim 5 having means for producing an input potential comprising two beating high frequency signals, said signal indicator being energized by the output and comprising a cathode ray tube having a grid connected to said output to thereby control the intensity of the beam, and a sweep circuit for moving the beam.

8. A radar receiver comprising an input circuit for the reflected waves, means for beating the reflected waves with waves of the frequency of the transmitted signals, means connected to the input circuit and to said first-named means for intermittently increasing and decreasing the signals during sustained rises and falls of the beating signals, a cathode ray tube having a grid to control the intensity of the beam, means for controlling the potential on said grid according to the output of the second-named means, and a sweep circuit for sweeping the beam at pulse repetition rate.

9. The receiver of claim 8 including in addition a sweep circuit for producing a beam deflection perpendicular to that of the first-named sweep and with a sweep far slower than the first-named sweep.

10. An electrical signal indicating system comprising an input circuit having an output potential characteristic in the form of a series of peaks and troughs when the input increases or decreases, said input circuit comprising a plurality of electron discharge devices each having a cathode and an anode with first, second and third grids between the cathode and the anode, means rendering the second grids positive relative to their respective cathodes, means for biasing the third grids of said devices to render such grids effective in enabling flow to the respective anodes, the last-named means including means to place a bias on each third grid to render it negative with respect to its complementary cathode at about the peak point of the output characteristic of the electron discharge device during a rise in potential on the first grid thereof, input means for applying predetermined different percentages of the total input potential between the control grids and cathodes of said devices respectively, output means for combining the anode currents of said devices; and a signal indicator coupled to said output means, said indicator including a spot of light modulated by the signal in said output means.

11. The system of claim 10 having resistors respectively connected in series with said first grids.

12. In a system for indicating a signal, a plurality of at least three electron discharge devices each having a cathode and first and second grids and an anode, a power circuit having a source with its negative side connected to said cathodes and its positive side connected to said anodes and including output means for combining the anode currents of the anodes of said devices, means for placing a bias on the second grid of each device relative to the respective cathodes which bias is positive when the device is in quiescent condition and negative when the device conducts its ultimate current, an input connected between the first grid and cathode of each of said devices, means included in the circuit of the second of said devices to render it non-conducting over the range of input potentials that the first device is conductive and to render it conductive over a second range higher than the first-named range, means in the circuit of the third device to render it non-conducting over the first and second ranges of input potential and conducting over a range of input potential higher than the second range, the circuit of each device including means to effect reduction of the anode current of the device in response to further increase in the input to the device after the second grid of the device has become negative with respect to the cathode of the device, and a signal indicator coupled to said output means, said indicator including means modulating a spot of light, said modulator means being controlled by the combined signal in said output means.

13. A signal indicating system comprising an input circuit for receiving a signal to be indicated and comprising a plurality of current producing stages, means coupling predetermined different portions of said input signal to each of said stages respectively to control current flow thereof, means maintaining each of said stages at a given steady state condition until a signal of predetermined magnitude is coupled thereto, each of said stages including means for varying the output thereof when the portion of signal coupled thereto varies within predetermined limits and for producing an input/output characteristic for each stage in which there is a rising characteristic when the signal coupled to that stage exceeds the required predetermined magnitude for that stage, said rising characteristic reaching a peak value and then decreasing to a substantially steady state value as the signal coupled to that stage increases within said predetermined limits for that stage, output means combining the current flows of said stages, and indicator means coupled to said output means, said indicator means including light producing means, and modulator means responsive to the signal in said output means for varying the intensity of light from said light producing means.

14. An electrical indicating system comprising a signal indicating device in which light is modulated in intensity by the signal to be indicated, and a circuit for modifying the signal to be applied to said indicating device, said circuit having an input/output characteristic of predetermined zig-zag configuration which is independent of time, said circuit including means so that as said input signal is progressively increased from a low to a high value, the magnitude of the output signal passes through a plurality of predetermined and successive maxima and minima, each magnitude of input signal between said low and high values having a corresponding output signal of fixed and predetermined magnitude.

References Cited in the file of this patent

UNITED STATES PATENTS

| Number | Name | Date |
|---|---|---|
| 1,711,658 | Sprague | May 7, 1929 |
| 2,076,229 | Dunn | Apr. 6, 1937 |
| 2,086,904 | Evans | July 13, 1937 |
| 2,230,243 | Haffcke | Feb. 4, 1941 |
| 2,292,045 | Burnett | Aug. 4, 1942 |
| 2,373,997 | Boykin | Apr. 17, 1945 |
| 2,405,238 | Seeley | Aug. 5, 1946 |
| 2,416,355 | Skellett | Feb. 25, 1947 |
| 2,448,762 | Beste | Sept. 7, 1948 |
| 2,453,454 | Norwine | Nov. 9, 1948 |
| 2,465,113 | Norgaard | Mar. 22, 1949 |

OTHER REFERENCES

Review of Scientific Instruments, Feb. 1941, pages 102–103.